(12) United States Patent
Choi et al.

(10) Patent No.: US 9,720,136 B2
(45) Date of Patent: Aug. 1, 2017

(54) PHOTO-ALIGNMENT COPOLYMER, OPTICAL ANISTROPIC FILM AND ITS PREPARATION METHOD

(71) Applicant: LG CHEM, LTD., Seoul (KR)

(72) Inventors: Dai Seung Choi, Daejeon (KR); Dong Woo Yoo, Daejeon (KR); Sung-Ho Chun, Daejeon (KR); Hyeong Bin Jang, Daejeon (KR); Mi Ra Hong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/419,450

(22) PCT Filed: Aug. 27, 2013

(86) PCT No.: PCT/KR2013/007675
§ 371 (c)(1),
(2) Date: Feb. 3, 2015

(87) PCT Pub. No.: WO2014/035116
PCT Pub. Date: Mar. 6, 2014

(65) Prior Publication Data
US 2015/0219794 A1    Aug. 6, 2015

(30) Foreign Application Priority Data

Aug. 27, 2012 (KR) .................. 10-2012-0093688
Aug. 27, 2013 (KR) .................. 10-2013-0101441

(51) Int. Cl.
| | | |
|---|---|---|
| C08F 2/46 | (2006.01) | |
| C08F 2/50 | (2006.01) | |
| C08G 61/04 | (2006.01) | |
| G02B 1/04 | (2006.01) | |
| C08F 220/30 | (2006.01) | |
| C08F 222/20 | (2006.01) | |

(52) U.S. Cl.
CPC .............. G02B 1/04 (2013.01); C08F 220/30 (2013.01); C08F 222/20 (2013.01)

(58) Field of Classification Search
CPC . G02B 1/04; C08F 22/20; C08L 33/14; C08L 2666/70; C08J 5/18
USPC .............................. 522/173, 1, 183, 182, 178
See application file for complete search history.

(56) References Cited

U.S. PATENT DOCUMENTS 6,201,087 B1   3/2001   Herr et al.

FOREIGN PATENT DOCUMENTS

| CN | 1159815 A | 9/1997 |
|---|---|---|
| CN | 1194996 A | 10/1998 |
| CN | 101300323 B | 11/2008 |
| CN | 102344817 A | 2/2012 |
| JP | 10506420 A | 6/1998 |
| JP | 2005-024909 A | 1/2005 |
| JP | 2008-262074 A | 10/2008 |
| JP | 2008-276149 A | 11/2008 |
| JP | 2012-145660 A | 2/2012 |
| JP | 2012027354 A | 2/2012 |
| JP | 2012-107198 | * 6/2012 |
| KR | 10-1997-0706321 A | 11/1997 |
| KR | 1019980057667 A | 9/1998 |
| KR | 100208974 B1 | 4/1999 |
| KR | 102004-0063910 A | 7/2004 |
| KR | 1020050070609 A | 7/2005 |
| KR | 1020070029100 A | 3/2007 |
| KR | 10-2007-0049087 A | 5/2007 |
| KR | 1020080046560 A | 5/2008 |
| KR | 1020090085420 A | 8/2009 |
| KR | 1020090121211 A | 11/2009 |
| KR | 1020100026459 A | 3/2010 |
| TW | 2007-20298 | 6/2007 |
| WO | 2011-125876 | * 10/2011 |
| WO | 2011125876 A1 | 10/2011 |
| WO | 2012014915 A1 | 2/2012 |

OTHER PUBLICATIONS

Kawatsuki et al, Photoinduced molecular reorientation in photoreactive liquid crystalline copolymers in a phase retarder application, Oct. 18, 2011, 52, 5788-5794.*

Mamiya et al, Is chemical crosslinking necessary for the photoinduced bending of polymer films, Journal of Materials Chemistry, 2008, 18, 63-65.*

Kawatsuki et al, Photoinduced molecular reorientation in photoreactive liquid crystalline copolymers in a phase retarder application, Oct. 18, 2011, Polymer, 52, 5788-5794.*

Bieringer et al, Relaxation of holographic gratings in liquid-crystalline side chain polymers with azo chromophores, 1995, Macromol. Chem. Phys. 196, 1375-1390.*

(Continued)

*Primary Examiner* — Jessica E Whiteley
(74) *Attorney, Agent, or Firm* — Dentons US LLP

(57) ABSTRACT

This invention relates to a photo-alignment copolymer which enables the formation of an optical anisotropic film that exhibits superior optical anisotropy, an optical anisotropic film using the photo-alignment copolymer and a method of manufacturing the optical anisotropic film. The photo-alignment copolymer includes both of a photo-alignment repeating unit having a photo-reactive functional group such as a cinnamate-based functional group, a chalcone-based functional group, an azo-based functional group or a coumarin-based functional group, and a repeating unit having a specific structure able to increase optical anisotropy.

21 Claims, 1 Drawing Sheet

(56) References Cited

OTHER PUBLICATIONS

Koji et al, WO 2011-125876 Machine Translation, Oct. 13, 2011.*
Otsuki et al, JP 2012-107198 Part 1 Machine Translation, Jun. 7, 2012.*
Otsuki et al, JP 2012-107198 Part 2 Machine Translation, Jun. 7, 2012.*

* cited by examiner

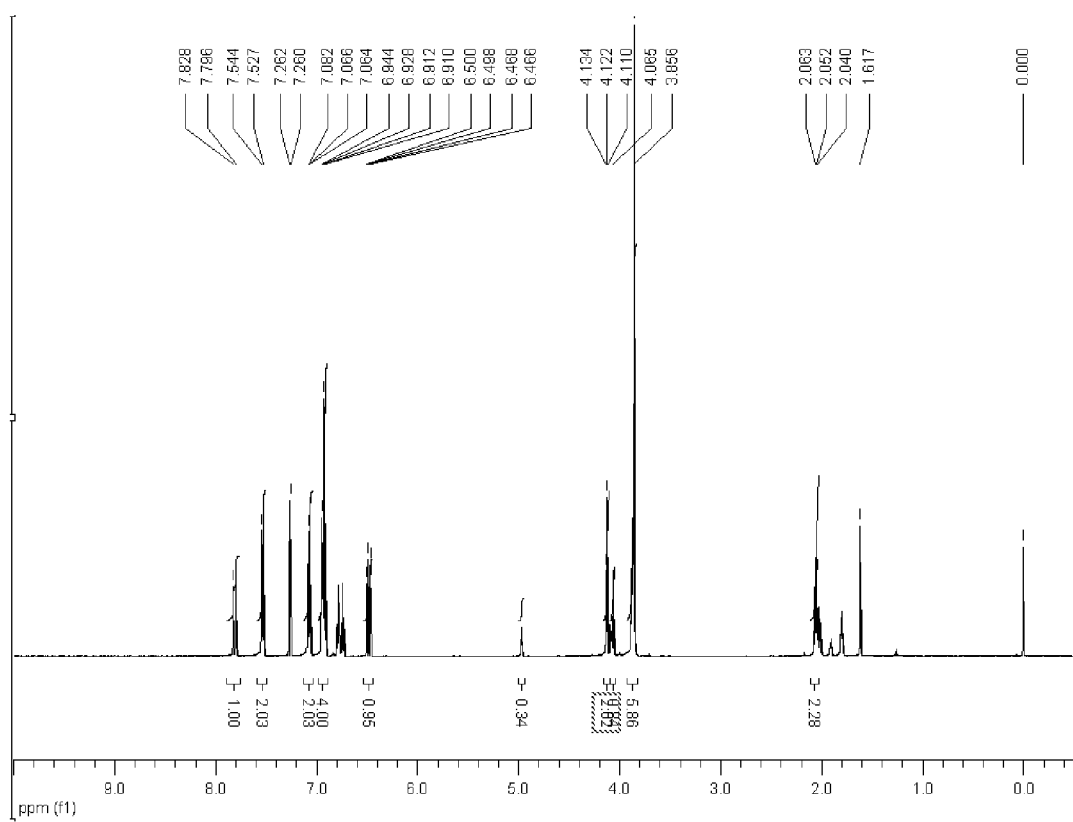

PHOTO-ALIGNMENT COPOLYMER, OPTICAL ANISTROPIC FILM AND ITS PREPARATION METHOD

This application is a 35 USC §371 National Stage entry of International Application No. PCT/KR2013/007675, filed on Aug. 27, 2013, which claims priority to and benefit of Korean Application Nos. 10-2012-0093688, filed on Aug. 27, 2012 and 10-2013-0101441 filed Aug. 27, 2013, all of which are hereby incorporated by reference in their entirety.

FIELD OF THE INVENTION

The present invention relates to a photo-alignment copolymer, an optical anisotropic film using the photo-alignment copolymer and a method of manufacturing the optical anisotropic film. More particularly, the present invention relates to a photo-alignment copolymer which enables the formation of an optical anisotropic film that exhibits superior optical anisotropy, a composition for forming an optical anisotropic film including the photo-alignment copolymer, an optical anisotropic film using the composition and a method of manufacturing the optical anisotropic film.

DESCRIPTION OF THE RELATED ART

With the recent trend of increasing the size of liquid crystal displays, their applications are expanding from personal devices such as mobile phones or notebook computers to home appliances such as wall-mountable TVs. Thus, liquid crystal displays are required to have high definition, high quality and wide viewing angles. In particular, because thin film transistor-liquid crystal displays (TFT-LCDs) driven by TFT allow respective pixels to independently operate, the response rate of liquid crystals becomes very high, making it possible to achieve high-definition video images. Accordingly, TFT-LCDs have a variety of applications.

In order for liquid crystals of TFT-LCDs to function as an optical switch, liquid crystals have to be initially aligned in a predetermined direction on a TFT layer located at the innermost position of a display cell. To this end, a liquid crystal alignment layer is utilized. Particularly, photo-alignment methods for orienting a liquid crystal alignment layer by light such as UV are being broadly reviewed these days.

Typically for such photo-alignment, an alignment layer containing a photo-alignment polymer is formed under a liquid crystal layer, and then irradiated with linearly polarized UV so that photoreaction takes place. As a result, photo-alignment in which the backbone of the photo-alignment polymer is arranged in a predetermined direction occurs, and the alignment layer thus optically aligned has an influence on aligning liquid crystals contained in the layer located thereon.

However, a conventional liquid crystal alignment layer is mostly poor in terms of optical anisotropy or liquid crystal alignability.

SUMMARY OF THE INVENTION

Accordingly, the present invention is intended to provide a photo-alignment copolymer, which enables the formation of an optical anisotropic film that exhibits superior optical anisotropy.

In addition, the present invention is intended to provide a composition for forming an optical anisotropic film, which includes the photo-alignment copolymer so as to form a film that exhibits superior optical anisotropy even without a need to form an additional liquid crystal layer.

In addition, the present invention is intended to provide an optical anisotropic film formed from the composition and a method of manufacturing the optical anisotropic film.

The present invention provides a photo-alignment copolymer, including a photo-alignment repeating unit having a photo-reactive functional group such as a cinamate-based functional group, a chalcone-based functional group, an azo-based functional group or a coumarin-based functional group, and a repeating unit of Chemical Formula 2 below:

[Chemical Formula 2]

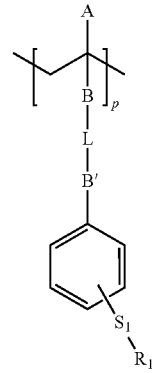

wherein A is each independently hydrogen or C1~C3 alkyl,

B and B' are each independently carbonyl, —C(=O)O—, —OC(=O)—, —O— or —S—,

L is a single bond, or substituted or unsubstituted C1~C20 alkylene, $S_1$ is carbonyl, —C(=O)O—, —OC(=O)—, —O— or —S—, and $R_1$ is hydrogen, substituted or unsubstituted C1~C20 alkyl, or substituted or unsubstituted C6~C15 aryl.

In addition, the present invention provides a composition for forming an optical anisotropic film, which includes the photo-alignment copolymer. Such a composition may further include a reactive mesogen, and may additionally include a photocurable binder and a photoinitiator.

In addition, the present invention provides a method of manufacturing an optical anisotropic film, including irradiating the composition for forming an optical anisotropic film with polarized UV, thus optically aligning at least a portion of a photo-reactive functional group linked to a photo-alignment copolymer; and thermally treating the composition in which at least a portion of the photo-reactive functional group is optically aligned, thus increasing optical anisotropy.

In addition, the present invention provides an optical anisotropic film, including a cured product of the composition for forming an optical anisotropic film.

Such an optical anisotropic film may play a role as a liquid crystal alignment film, an optical filter, a phase difference film, a polarizer or a polarized light emitter for use in various optical devices such as liquid crystal displays.

According to the present invention, a novel photo-alignment copolymer can be provided, which enables the formation of an optical anisotropic film that exhibits superior optical anisotropy by increasing optical anisotropy via a repeating unit of Chemical Formula 2, etc.

Also, in the case where a reactive mesogen is optionally used along with the photo-alignment copolymer, an optical anisotropic film that exhibits superior liquid crystal alignability and optical anisotropy can be provided using a simple process, even without a need to additionally form a liquid crystal layer.

BRIEF DESCRIPTION OF THE DRAWING

FIG. 1 illustrates NMR data of the monomer compound for forming a photo-alignment repeating unit obtained in Preparation Example 4.

DESCRIPTION OF THE PREFERRED EMBODIMENTS

Hereinafter, a detailed description will be given of a photo-alignment copolymer, an optical anisotropic film using the photo-alignment copolymer and a method of manufacturing the optical anisotropic film according to embodiments of the present invention.

Unless otherwise explained, some terms used herein may be defined as follows.

Any material, polymer or functional group, which exhibits "photo-alignability" or "photo-reactivity," means that orientation or alignment of a liquid crystal compound may be induced by developing or arranging the corresponding material, polymer or functional group (photo-reactive functional group) in a predetermined direction with respect to the polarization direction when irradiated with linearly polarized light, for example, linearly polarized UV.

The term "reactive mesogen (RM)" refers to a material which may be polymerized, crosslinked or cured via irradiation of light such as UV because of a polymerizable, crosslinkable or curable unsaturated group contained in the molecule thereof, and also which includes at least one mesogen group and thus exhibits liquid crystal behavior. The mesogen group may include any mesogen-based functional group contained in known liquid crystal compounds, and the range and kind thereof are widely known to those skilled in the art.

The term "(photo)cured product" or "(photo)cured" means to be inclusive of not only the case where a component having a curable or crosslinkable unsaturated group in a chemical structure is completely cured, crosslinked or polymerized but also the case where such a component is partially cured, crosslinked or polymerized.

A composition for forming an optical anisotropic film or a cured product thereof, which is provided in the form of a "single layer," means that another layer including the same kind of component as in the above composition is not present on a substrate. For example, a composition including a photo-alignment (co)polymer and a liquid crystal compound such as reactive mesogen or a cured product thereof, which is provided in the form of a "single layer," means that another layer including the same kind of photo-alignment material or liquid crystal material (reactive mesogen or other liquid crystal materials) is not present on a substrate, and also that the photo-alignment (co)polymer and the liquid crystal compound such as reactive mesogen are contained only in the corresponding single layer. As such, it is a matter of course that another layer including a different kind of component may be present on the substrate.

A first embodiment of the present invention provides a photo-alignment copolymer, which includes a photo-alignment repeating unit having a photo-reactive functional group such as a cinamate-based functional group, a chalcone-based functional group, an azo-based functional group or a coumarin-based functional group, and a repeating unit represented by Chemical Formula 2 below:

[Chemical Formula 2]

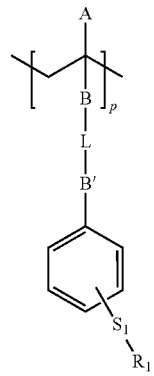

in Chemical Formula 2,
A is each independently hydrogen or C1~C3 alkyl,
B and B' are each independently carbonyl, —C(=O)O—, —OC(=O)—, —O— or —S—,
L is a single bond, or substituted or unsubstituted C1~C20 alkylene,
$S_1$ is carbonyl, —C(=O)O—, —OC(=O)—, —O— or —S—, and
$R_1$ is hydrogen, substituted or unsubstituted C1~C20 alkyl, or substituted or unsubstituted C6~C15 aryl.

The photo-alignment copolymer according to the first embodiment includes both of a photo-alignment repeating unit having a predetermined photo-reactive functional group such as a cinnamate-based functional group, etc. linked to the end thereof, and a repeating unit of Chemical Formula 2 having a liquid crystal functional group such as a phenylene group linked to the end thereof.

As the photo-alignment repeating unit of the photo-alignment copolymer includes a predetermined photo-reactive functional group such as a cinnamate-based functional group, etc. known to exhibit superior photo-reactivity, superior photo-reactivity and photo-alignability with respect to linearly polarized UV may be manifested.

Furthermore, it has been confirmed that, when heat is applied to the liquid crystal functional group contained in the repeating unit of Chemical Formula 2 of the photo-alignment copolymer, such a functional group may interact with the photo-reactive functional group which is optically reacted or aligned, thus greatly increasing optical anisotropy. Therefore, alignment of liquid crystals using the photo-alignment copolymer may occur more efficiently.

Thus, the case where an optical anisotropic film is formed from the photo-alignment copolymer according to the first embodiment via thermal treatment after irradiation with linearly polarized UV makes it possible to form an optical anisotropic film having remarkably improved photo-alignability and optical anisotropy than previously known. Moreover, the use of such an optical anisotropic film may result in further improved liquid crystal alignability.

Although a more detailed description thereof will be given later, in the case where an optical anisotropic film is formed using a composition resulting from mixing the photo-alignment copolymer according to the first embodiment with a reactive mesogen, it has been confirmed that liquid crystal alignment of the reactive mesogen may be induced by the optically aligned copolymer while the photo-alignment copolymer is increased in photo-alignment and optical anisotropy. Thus, when using the composition including both of the photo-alignment copolymer according to the first embodiment and the reactive mesogen, liquid crystal alignment may progress using photo-alignment, even without additionally forming two layers including an alignment layer and a liquid crystal layer.

Therefore, the use of the copolymer according to the first embodiment enables the formation of an optical anisotropic film that exhibits superior optical anisotropy, and furthermore, provided may be a film that shows superior liquid crystal alignability and optical anisotropy via a simple process without a need to form an additional liquid crystal layer.

Meanwhile, in the photo-alignment copolymer according to the first embodiment, the photo-reactive functional group may represent at least one selected from the group consisting of a cinnamate-based functional group of Chemical Formula 1a below, a coumarin-based functional group of Chemical Formula 1b below, an azo-based functional group of Chemical Formula 1c below and a chalcone-based functional group of Chemical Formula 1d below:

[Chemical Formula 1a]

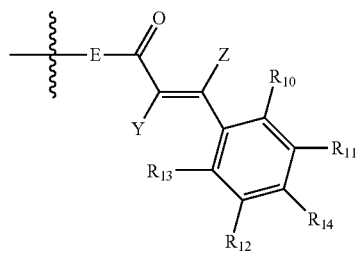

[Chemical Formula 1b]

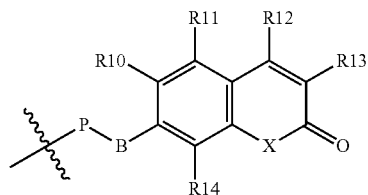

[Chemical Formula 1c]

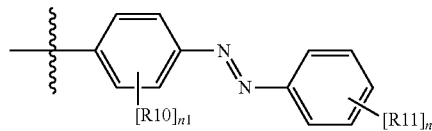

[Chemical Formula 1d]

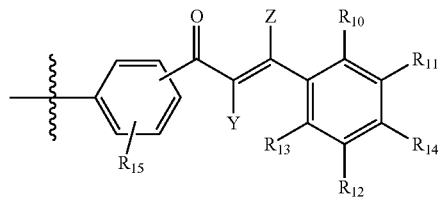

in Chemical Formulas 1a to 1d, n1 is an integer of 0 to 4, and n2 is an integer of 0 to 5, B is selected from the group consisting of a single bond; substituted or unsubstituted C1~C20 alkylene; carbonyl; carboxyl; ester; substituted or unsubstituted C1~C10 alkoxylene; substituted or unsubstituted C6~C40 arylene; and substituted or unsubstituted C6~C40 heteroarylene, E is a single bond; —O—; substituted or unsubstituted C1~C20 alkylene; or substituted or unsubstituted C6~C40 aryleneoxide, X is oxygen or sulfur, Y and Z are each independently hydrogen; or substituted or unsubstituted C1~C20 alkyl, P is selected from the group consisting of a single bond; substituted or unsubstituted C1~C20 alkylene; carbonyl; substituted or unsubstituted C2~C20 alkenylene; substituted or unsubstituted C3~C12 cycloalkylene; substituted or unsubstituted C6~C40 arylene; substituted or unsubstituted C7~C15 aralkylene; substituted or unsubstituted C2~C20 alkynylene; and substituted or unsubstituted C4~C8 cycloalkylene, $R_{10}$, $R_{11}$, $R_{12}$, $R_{13}$ and $R_{14}$ are identical to or different from each other and are each independently selected from the group consisting of hydrogen; halogen; substituted or unsubstituted C1~C20 alkyl; substituted or unsubstituted C4~C8 cycloalkyl; substituted or unsubstituted C1~C20 alkoxy; substituted or unsubstituted C6~C30 aryloxy; substituted or unsubstituted C6~C40 aryl; C6~C40 heteroaryl containing a hetero element of Group 14, 15 or 16; substituted or unsubstituted C6~C40 alkoxyaryl; cyano; nitrile; nitro; and hydroxyl, and $R_{15}$ is one or two substituents which are each independently selected from the group consisting of hydrogen; halogen; cyano; substituted or unsubstituted C1~C20 alkyl; substituted or unsubstituted C1~C20 alkoxy; substituted or unsubstituted C6~C30 aryloxy; substituted or unsubstituted C6~C40 aryl; C6~C40 heteroaryl containing a hetero element of Group 14, 15 or 16; and substituted or unsubstituted C6~C40 alkoxyaryl.

As the photo-reactive functional group has a specific structure selected from among Chemical Formulas 1a to 1d, photo-reactivity or photo-alignability of the photo-alignment repeating unit and the photo-alignment copolymer including the same may be further improved.

More specifically, the photo-alignment repeating unit having a specific photo-reactive functional group selected from among Chemical Formulas 1a to 1d may include a repeating unit of Chemical Formula 1 below:

[Chemical Formula 1]

in Chemical Formula 1,

A is each independently hydrogen or C1~C3 alkyl,

L' is a spacer group having a combination of at least one bivalent connecting group selected from the group consisting of a single bond, carbonyl, —C(=O)O—, —OC(=O)—, —O—, —S—, substituted or unsubstituted C1~C20 alkylene and substituted or unsubstituted C6~C40 arylene, and W is a photo-reactive functional group selected from the group consisting of Chemical Formulas 1a to 1 d.

The photo-alignment repeating unit of Chemical Formula 1 is configured such that a predetermined photo-reactive functional group such as a cinnamate-based functional group, etc. is linked to the end thereof via a predetermined spacer group. Thus, the photo-alignment repeating unit enables the photo-reactive functional group to more efficiently cause photoreaction without interference by, for example, an adjacent repeating unit or functional group such as the repeating unit of Chemical Formula 2. Consequently, the photo-alignment copolymer according to the first embodiment including such a repeating unit may manifest superior photo-reactivity, photoreaction rate, and photo-alignability, and it is possible to form an optical anisotropic film that exhibits further improved optical anisotropy using such a copolymer.

In the repeating unit of Chemical Formula 1, the spacer group of L' may have a structure in which a single bond or carbonyl, substituted or unsubstituted C1~C20 alkylene, and substituted or unsubstituted C6~C40 arylene are sequentially connected via —O—. More specifically, the spacer group of L' may have a connection structure of "(single bond or carbonyl)-O-(substituted or unsubstituted C1~C20 alkylene)-O-(substituted or unsubstituted C6~C40 arylene)-."

By the connection structure of such a spacer group, the photo-reactive functional group linked to the end of the spacer group may more efficiently cause photoreaction, and the photo-alignment copolymer may exhibit further improved photo-reactivity, photoreaction rate and photo-alignability.

Also, "substituted or unsubstituted C6~C40 arylene" contained in the spacer group of Chemical Formula 1 may represent unsubstituted C6~C40 arylene, for example, phenylene, and also such arylene may be substituted with at least one different functional group. In this case, examples of the substitutable functional group may include C1~C6 alkyl, C1~C6 halogenated (e.g. fluorinated) alkyl, halogen (e.g. fluorine), C1~C6 alkoxy, C1~C6 halogenated (e.g. fluorinated) alkoxy, C1~C6 alkylester, C1~C6 halogenated (e.g. fluorinated) alkylester, C1~C6 alkylate or C1~C6 halogenated (e.g. fluorinated) alkylate, and two or more selected from these may be used together for substitution.

Particularly in the case where a functional group including halogen such as fluorine is used for substitution, the photo-alignment copolymer according to the first embodiment may exhibit further improved photo-reactivity and photo-alignability.

Also, in the photo-alignment repeating unit of Chemical Formula 1 of the photo-alignment copolymer according to the first embodiment, C6~C40 heteroaryl containing a hetero element of Group 14, 15 or 16, or C6~C40 aryl may include, but is not limited to, at least one selected from the following functional groups:

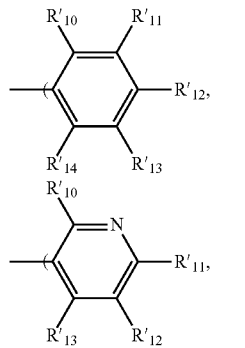
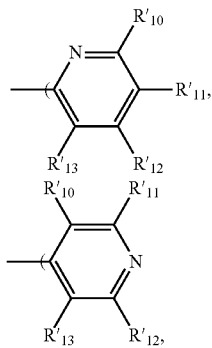
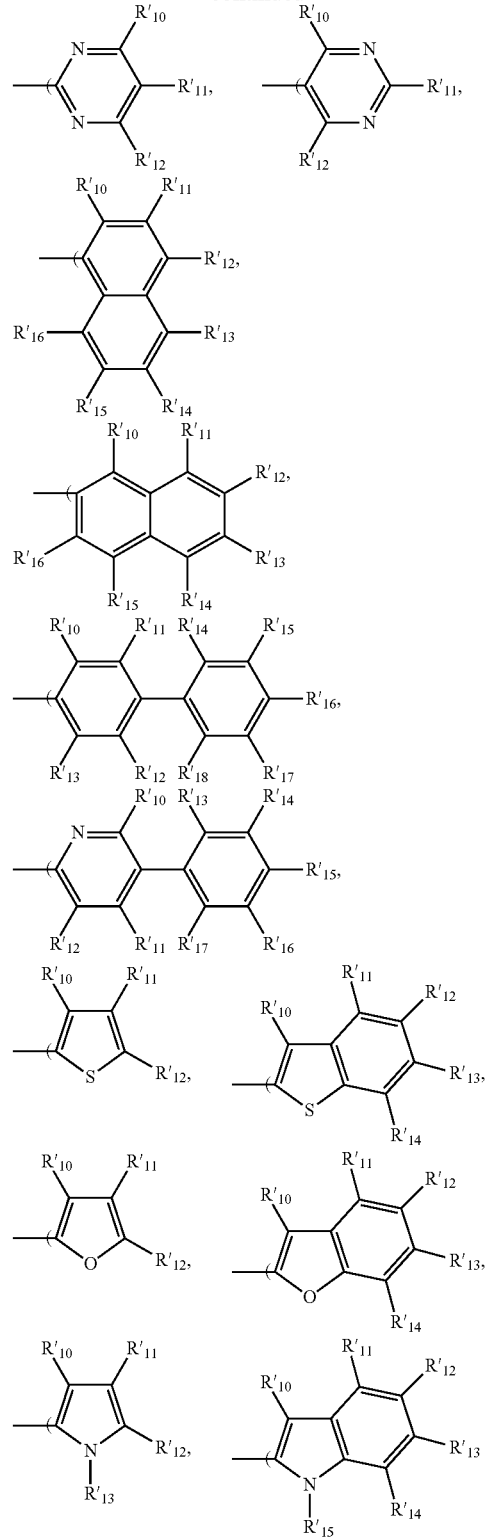

In the above chemical formulas, at least one of $R'_{10}$, $R'_{11}$, $R'_{12}$, $R'_{13}$, $R'_{14}$, $R'_{15}$, $R'_{16}$, $R'_{17}$, and $R'_{18}$ is substituted or unsubstituted C1~C20 alkoxy or substituted or unsubstituted C6~C30 aryloxy, and the others are identical to or different from each other and are each independently hydrogen, substituted or unsubstituted C1~C20 alkyl, substituted or unsubstituted C1~C20 alkoxy, substituted or unsubstituted C6~C30 aryloxy, or substituted or unsubstituted C6~C40 aryl.

In the photo-alignment copolymer according to the first embodiment, the spacer group of the repeating unit of Chemical Formula 2 may have a structure in which B is —C(=O)O—, L is substituted or unsubstituted C1-C20 alkylene, and B' is —O—. More specifically, the spacer group of —B-L-B'— may have a structure in which —C(=O)O—, substituted or unsubstituted C1~C20 alkylene and —O— are sequentially connected. As a specific example, the spacer group may have a connection structure of "—C(=O)O— (substituted or unsubstituted C1-C20 alkylene)-O—."

By the connection structure of such a spacer group, the liquid crystal functional group linked to the end of the spacer group does not obstruct photoreaction of the photo-reactive functional group, and may more efficiently interact with the optically reacted or aligned photo-reactive functional group when heat is applied thereto, thus remarkably increasing optical anisotropy.

In the repeating unit of the Chemical Formula 2, $S_1$ linked to phenylene is preferably —C(=O)O—, and $R_1$ is preferably substituted or unsubstituted C1~C20 alkyl. As such a functional group is linked to the end of the liquid crystal functional group, the liquid crystal functional group may more efficiently interact with the optically reacted or aligned photo-reactive functional group when heat is applied thereto, thus further increasing optical anisotropy.

The photo-alignment copolymer may include only one kind of each of the photo-alignment repeating unit and the repeating unit of Chemical Formula 2, but it may include two or more kinds of each of these repeating units, and may further include other repeating units known to be contained in the photo-alignment polymer, in addition to the repeating units as above.

In order to form a film which shows superior optical anisotropy from the photo-alignment copolymer, the photo-alignment copolymer may include the photo-alignment repeating unit and the repeating unit of Chemical Formula 2 the sum of which is about 50 mol % or more, about 70 mol % or more, about 80 mol % or more, or about 90 mol % or more based on the total amount of the copolymer. Also, the photo-alignment copolymer may include the photo-alignment repeating unit and the repeating unit of Chemical Formula 2 such that the molar ratio of the photo-alignment repeating unit:the repeating unit of Chemical Formula 2 is about 10:90 to 99:1, about 30:70 to 90:10, or about 50:50 to 80:20. Thereby, while the photo-alignment copolymer exhibits superior photo-reactivity and photo-alignability, optical anisotropy of the copolymer and the film including the copolymer may be more effectively enhanced by the action of the repeating unit of Chemical Formula 2.

Taking into consideration superior photo-reactivity, photo-alignability and substrate coatability of the photo-alignment copolymer, the photo-alignment copolymer may have a weight average molecular weight of about 20,000 to 1,000,000, about 50,000 to 700,000, or about 100,000 to 500,000.

Throughout the specification which describes the structure of the photo-alignment copolymer as above and the structure of the reactive mesogen as will be described later, individual substituents may be defined as follows.

The term "alkyl" refers to a linear or branched saturated monovalent hydrocarbon moiety of 1 to 20, preferably 1 to 10 and more preferably 1 to 6 carbon atoms. The alkyl group may be inclusive of not only those unsubstituted but also those further substituted with a predetermined substituent as will be described later. Examples of the alkyl group may include methyl, ethyl, propyl, 2-propyl, n-butyl, iso-butyl, tert-butyl, pentyl, hexyl, dodecyl, fluoromethyl, difluoromethyl, trifluoromethyl, chloromethyl, dichloromethyl, trichloromethyl, iodomethyl, bromomethyl, etc.

The term "alkenyl" refers to a linear or branched monovalent hydrocarbon moiety of 2 to 20, preferably 2 to 10 and more preferably 2 to 6 carbon atoms, with at least one carbon-carbon double bond. The alkenyl group may be linked via carbon atoms including a carbon-carbon double bond or via saturated carbon atoms. The alkenyl group may be inclusive of not only those unsubstituted but also those further substituted with a predetermined substituent as will be described later. Examples of the alkenyl group may include ethenyl, 1-propenyl, 2-propenyl, 2-butenyl, 3-butenyl, pentenyl, 5-hexenyl, dodecenyl, etc.

The term "cycloalkyl" refers to a saturated or unsaturated non-aromatic monovalent monocyclic, bicyclic or tricyclic hydrocarbon moiety of 3 to 12 ring carbons, and may be inclusive of those further substituted with a predetermined substituent as will be described later. Examples thereof may include cyclopropyl, cyclobutyl, cyclopentyl, cyclopentenyl, cyclohexyl, cyclohexenyl, cycloheptyl, cyclooctyl, decahydronaphthalenyl, adamantly, norbornyl (i.e. bicyclo [2,2,1] hep-5-enyl), etc.

The term "aryl" refers to a monovalent monocyclic, bicyclic or tricyclic aromatic hydrocarbon moiety having 6 to 40 and preferably 6 to 12 ring atoms, and may be inclusive of those further substituted with a predetermined substituent as will be described later. Examples of the aryl group may include phenyl, naphthalenyl, fluorenyl, etc.

The term "alkoxyaryl" refers to an aryl radical in which at least one hydrogen atom of the aryl group defined above is substituted with an alkoxy group. Examples of the alkoxyaryl group may include methoxyphenyl, ethoxyphenyl, propoxyphenyl, butoxyphenyl, pentoxyphenyl, hexoxyphenyl, heptoxy, octoxy, nanoxy, methoxybiphenyl, methoxynaphthalenyl, methoxyfluorenyl, methoxyanthracenyl, etc.

The term "aralkyl" refers to an alkyl radical in which at least one hydrogen atom of the alkyl group defined above is substituted with an aryl group, and may be inclusive of those further substituted with a predetermined substituent as will be described later. Examples thereof may include benzyl, benzhydryl, trityl, etc.

The term "alkynyl" refers to a linear or branched monovalent hydrocarbon moiety of 2 to 20, preferably 2 to 10 and more preferably 2 to 6 carbon atoms, with at least one carbon-carbon triple bond. The alkynyl group may be linked via carbon atoms including a carbon-carbon triple bond or via saturated carbon atoms. The alkynyl group may be inclusive of those further substituted with a predetermined substituent as will be described later. Examples thereof may include ethynyl, propynyl, etc.

The term "alkylene" refers to a linear or branched saturated bivalent hydrocarbon moiety of 1 to 20, preferably 1 to 10 and more preferably 1 to 6 carbon atoms. The alkylene group may be inclusive of those further substituted with a predetermined substituent as will be described later. Examples of the alkylene group may include methylene, ethylene, propylene, butylene, hexylene, etc.

The term "alkenylene" refers to a linear or branched bivalent hydrocarbon moiety of 2 to 20, preferably 2 to 10 and more preferably 2 to 6 carbon atoms, with at least one carbon-carbon double bond. The alkenylene group may be linked via carbon atoms including a carbon-carbon double bond and/or via saturated carbon atoms, and may be inclusive of those further substituted with a predetermined substituent as will be described later.

The term "cycloalkylene" refers to a saturated or unsaturated non-aromatic bivalent monocyclic, bicyclic or tricyclic hydrocarbon moiety of 3 to 12 ring carbons, and may be inclusive of those further substituted with a predetermined substituent as will be described later. Examples thereof may include cyclopropylene, cyclobutylene, etc.

The term "arylene" refers to a bivalent monocyclic, bicyclic or tricyclic aromatic hydrocarbon moiety having 6 to 20 and preferably 6 to 12 ring atoms, and may be inclusive of those further substituted with a predetermined substituent as will be described later. The aromatic moiety contains only carbon atoms. Examples of the arylene group may include phenylene, etc.

The term "aralkylene" refers to a bivalent moiety in which at least one hydrogen atom of the alkyl group defined above is substituted with an aryl group, and may be inclusive of those further substituted with a predetermined substituent as will be described later. Examples thereof may include benzylene, etc.

The term "alkynylene" refers to a linear or branched bivalent hydrocarbon moiety of 2 to 20, preferably 2 to 10 and more preferably 2 to 6 carbon atoms, with at least one carbon-carbon triple bond. The alkynylene group may be linked via carbon atoms including a carbon-carbon triple bond or via saturated carbon atoms, and may be inclusive of those further substituted with a predetermined substituent as will be described later. Examples thereof may include ethynylene, propynylene, etc.

The aforementioned substituents, which are "substituted or unsubstituted," mean to be inclusive of not only these individual substituents themselves but also those further substituted with a predetermined substituent. Unless otherwise mentioned herein, examples of the substituent used to further substitute individual substituents may include halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, siloxy, etc.

The photo-alignment copolymer may be prepared by subjecting acrylate- or vinylalcohol-based monomers respectively corresponding to the photo-alignment repeating unit, for example, the repeating unit of Chemical Formula 1 and the repeating unit of Chemical Formula 2 to free radical polymerization under typical conditions, thus connecting vinyl groups of the monomers. The conditions and methods of the free radical polymerization are well known to those skilled in the art, and an additional description thereof is omitted.

A second embodiment of the present invention provides a composition for forming an optical anisotropic film, which includes the photo-alignment copolymer according to the first embodiment. The composition according to the second embodiment enables the formation of an optical anisotropic film that shows further improved photo-alignability and optical anisotropy, by the action of the copolymer according to the first embodiment.

Also, the composition according to the second embodiment may further include a reactive mesogen, in addition to the photo-alignment copolymer. Such a reactive mesogen may be defined as a compound having a mesogen group that shows liquid crystal behavior, and a photopolymerizable, photocrosslinkable or photocurable unsaturated functional group, for example, a vinyl group, a (meth)acryl group or an epoxy group, linked to the end of at least one side thereof, and any compound which satisfies the above definition may be contained as the reactive mesogen in the composition according to the second embodiment.

In the course of forming an optical anisotropic film using the composition according to the second embodiment, when such a composition is irradiated with linearly polarized UV, the photo-reactive functional group of the photo-alignment copolymer may induce photoreaction and photo-alignment, and optical anisotropy may be greatly enhanced by the repeating unit of Chemical Formula 2 upon subsequent thermal treatment, as mentioned above. However, in the case where the reactive mesogen is contained in the composition according to the second embodiment, liquid crystal alignment of the reactive mesogen may gradually occur due to the effect of the photo-alignment copolymer in the course of optically aligning the photo-alignment copolymer or enhancing optical anisotropy via thermal treatment.

As a result, liquid crystal alignment may be carried out using photo-alignment even when an additional process for aligning liquid crystals is not performed using the photo-alignment copolymer, without forming an additional liquid crystal layer. Thus, it becomes possible to provide an optical anisotropic film which exhibits superior liquid crystal alignability and optical anisotropy via a simpler process.

Furthermore, liquid crystal alignment of the reactive mesogen may be stabilized via the crosslinked structure of a binder resin formed from a binder as will be described later. Therefore, it is also possible to provide an optical anisotropic film which exhibits superior liquid crystal alignability and alignment stability from the composition according to the second embodiment.

Taking into consideration high interaction with the photo-alignment copolymer and further improved liquid crystal alignability, the reactive mesogen may include a compound of Chemical Formula 3 or 4 below or a mixture thereof. In addition thereto, various reactive mesogens having a mesogen group derived from the compound of Chemical Formula 3 or 4, or other known reactive mesogens may also be used. The reactive mesogen may show any liquid crystal behavior such as nematic, cholesteric or ferroelectric behavior.

[Chemical Formula 3]

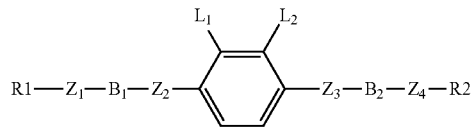

[Chemical Formula 4]

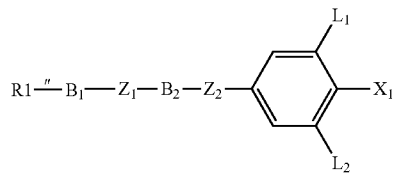

In Chemical Formulas 3 and 4, $L_1$ and $L_2$ are each independently selected from the group consisting of hydrogen, halogen, substituted or unsubstituted C1~C20 alkyl, substituted or unsubstituted C1~C8 alkyl ester, substituted or unsubstituted C1~C8 alkyl ether, and substituted or unsubstituted C1~C8 alkyl ketone, $B_1$ and $B_2$ are each independently substituted or unsubstituted C6~C20 arylene or substituted or unsubstituted C4~C8 cycloalkylene, R1 and R2 are each independently (meth)acryl or epoxy, $X_1$ is selected from the group consisting of C1~C7 alkyl unsubstituted or substituted with fluorine, C1~C7 alkoxy unsubstituted or substituted with fluorine, C2~C7 alkenyl unsubstituted or substituted with fluorine, C2~C7 alkenyloxy unsubstituted or substituted with fluorine, and C1~C7 alkoxyalkyl unsubstituted or substituted with fluorine, and $Z_1$, $Z_2$, $Z_3$ and $Z_4$ are each independently a single bond, —O—, —S—, —COO—, —OCO— or —OC(O)O—.

Also, the composition for forming an optical anisotropic film, according to the second embodiment, may include a photocurable binder, in addition to the photo-alignment copolymer and the reactive mesogen. Such a binder is formed into a binder resin having a reticular crosslinked structure via photocuring, thus stabilizing alignability of the photo-alignment copolymer and/or the reactive mesogen.

As the binder, any polymerizable compound, oligomer or polymer which may be cured via irradiation with light such as UV may be used without particular limitation. A (meth) acrylate compound, for example, a polyfunctional (meth) acrylate compound having a bifunctional or higher functional acrylate group may be used in terms of forming an appropriate polymerized, cured or crosslinked structure.

Specifically, the binder may be selected from among pentaerythritol triacrylate, tris(2-acrylolyloxyethyl)isocynurate, trimethylolpropane triacrylate, dipentaerythritol hexaacrylate, and mixtures of two or more thereof.

The composition according to the second embodiment may further include a photoinitiator, in addition to the above components. Such a photoinitiator may be any initiator known to initiate and facilitate photocuring of the binder, and for example, an initiator under brand name of Irgacure 907 or 819 may be used.

Also, the composition according to the second embodiment may further include an organic solvent, in order to dissolve individual components as above. The organic solvent may be selected from among toluene, xylene, anisole, chlorobenzene, dichloromethane, ethyl acetate, dichloroethane, cyclohexane, cyclopentane, propylene glycol methyl ether acetate, and mixtures of two or more thereof. In addition thereto, any solvent may be used so long as individual components are effectively dissolved therein depending on the kind thereof so as to be applied on the substrate.

The composition according to the second embodiment may include, based on the total weight of solids thereof, about 1 to 50 wt % of the photo-alignment copolymer, about 10 to 90 wt % of the reactive mesogen, about 1 to 50 wt % of the photocurable binder, and about 0.1 to 5 wt % of the photoinitiator. As such, the weight of solids may indicate the sum of weights of the components, other than the organic solvent, of the composition according to the second embodiment.

Also, the solid content of the composition according to the second embodiment may be about 10 to 80 wt %. Thereby, the composition may manifest preferable applicability. More specifically, in the case where the composition is to be cast in the form of a film, the solid content may be set to about 15 to 80 wt %, and in the case where the composition is to be formed into a thin film, the solid content may be set to about 10 to 40 wt %.

A third embodiment of the present invention provides a method of manufacturing an optical anisotropic film using the composition according to the second embodiment. This method may include irradiating the composition for forming an optical anisotropic film according to the second embodiment of the present invention with polarized UV, for example, linearly polarized UV, thus optically aligning at least a portion of a photo-reactive functional group linked to a photo-alignment copolymer (e.g. a photo-reactive functional group linked to a photo-alignment repeating unit of Chemical Formula 1, etc.); and thermally treating the composition in which at least a portion of the photo-reactive functional group is optically aligned, thus increasing optical anisotropy.

In the manufacturing method, when the photo-alignment step is performed under irradiation of polarized UV, at least a portion of the photo-reactive functional group of the photo-alignment copolymer may induce photoreaction such as isomerization or dimerization, and thereby may be optically aligned while being arranged in a predetermined direction. Subsequently, when the thermal treatment step is performed, optical anisotropy may be greatly increased by the repeating unit of Chemical Formula 2, consequently manufacturing an optical anisotropic film which exhibits remarkably improved photo-alignability and optical anisotropy than previously known.

Moreover, in the case where an optical anisotropic film is obtained using the composition including both of the photo-alignment copolymer and the reactive mesogen, the reactive mesogen may adopt alignment of the copolymer and thus may undergo liquid crystal alignment under the influence of the copolymer in which at least a portion of the photo-reactive functional group is optically aligned and which has enhanced optical anisotropy. The liquid crystal alignment of the reactive mesogen may gradually progress through the photo-alignment step and the thermal treatment step to increase optical anisotropy. Therefore, it is possible to provide an optical anisotropic film which exhibits superior optical anisotropy and liquid crystal alignability via a very easy and simple process even by the formation of a single layer without additionally forming a liquid crystal layer.

In the photo-alignment step, the composition for forming an optical anisotropic film may be irradiated with polarized UV in a wavelength range of about 150 to 450 nm. The wavelength range of the polarized UV may be adjusted depending on the specific configuration of the photo-alignment copolymer or the kind of photo-reactive functional group. Although the intensity of irradiated UV may vary depending on the specific kind of photo-alignment copolymer or the photo-reactive functional group linked thereto, an energy of about 50 mJ/cm$^2$ to 10 J/cm$^2$, and preferably about 500 mJ/cm$^2$ to 5 J/cm$^2$ may be applied.

The UV is subjected to polarizing treatment by using a process in which UV is passed through or reflected from (1) a polarizing device using a substrate, in which the surface of a transparent substrate such as quartz glass, sodalime glass, or sodalime-free glass is coated with a dielectric anisotropic material, (2) a polarizing plate on which aluminum or metal wire is finely deposited, or (3) a Bruster polarizing device using reflection by quartz glass, and UV subjected to such polarizing treatment may be applied to the composition. The polarized UV may be applied in a direction perpendicular to the surface of the substrate, or may be slantingly applied at a specific incident angle.

Also upon UV irradiation, the temperature of the substrate may approximate to room temperature, but in some cases, UV may be applied in a state of heated in the temperature range of about 100° C. or less.

After the photo-alignment step, the thermal treatment step to increase optical anisotropy may be performed at about 100 to 300° C. for about 1 to 30 min. This thermal treatment makes it possible to effectively increase optical anisotropy of the optically aligned copolymer and to provide a film which shows superior optical anisotropy.

Under polarized UV in the photo-alignment step, photo-curing of the binder and/or the reactive mesogen contained in the composition for forming an optical anisotropic film may be conducted together. In this case, as the photo-alignment step and the thermal treatment step are carried out once, an optical anisotropic film in a cured state may be manufactured. For more effective photocuring, irradiating the composition with UV to photocure the photocurable binder and/or the reactive mesogen may be further performed, after the thermal treatment step.

When such photocuring progresses, a binder resin having a reticular crosslinked structure, for example, a (meth)acrylate-based crosslinked polymer including a potocured (photocrosslinked) polyfunctional (meth)acrylate compound, may be formed, and a cured product in which at least a portion of the curable unsaturated group of the reactive mesogen is photocured may be formed. Therefore, alignability of the photo-alignment copolymer and/or the reactive mesogen may be stabilized thanks to the crosslinked structure of the binder resin.

In the manufacturing method as above, the composition for forming an optical anisotropic film is applied onto the substrate, dried and then optically aligned using polarized UV. As such, the coating process may be appropriately determined depending on the kind of photo-alignment copolymer, reactive mesogen or substrate, and may be exemplified by roll coating, spin coating, printing, inkjet spraying or slit nozzle.

Additionally, in order to further enhance adhesion to the substrate, a functional silane-containing compound, a functional fluorine-containing compound or a functional titanium-containing compound may be applied onto the substrate in advance.

In the drying step to remove the organic solvent, the coating may be heated or vacuum evaporation may be conducted. The drying step may be performed at about 50 to 250° C. for about 1 to 20 min.

A fourth embodiment of the present invention provides an optical anisotropic film, which is formed on the substrate and includes a cured product of the composition for forming an optical anisotropic film as above. The optical anisotropic film may include only a single layer of the cured product, without an additional layer containing the same kind of photo-alignment copolymer and/or a liquid crystal material such as reactive mesogen, for example, an additional liquid crystal layer.

The optical anisotropic film may be obtained using, for example, the method according to the third embodiment, including applying the composition including the photo-alignment copolymer, and optionally, the reactive mesogen, the photocurable binder and the photoinitiator, followed by performing a photo-alignment step, a thermal treatment step, and optionally, a photocuring step. Thereby, the optical anisotropic film may be provided in the form of a single layer, and may exhibit superior optical anisotropy while being obtained via a very simple process.

In the optical anisotropic film, the cured product may include the photo-alignment polymer in which at least a portion of the photo-reactive functional group is optically aligned, and optionally, may further include a cured product of the reactive mesogen optically aligned by the optically aligned photo-reactive functional group and/or a binder resin including a (meth)acrylate-based crosslinked polymer.

As such, the extent of liquid crystal alignment of the reactive mesogen may be determined by luminance between orthogonally crossed polarized rays. For example, when the optical anisotropic film is disposed at 45° between orthogonal polarizing plates, liquid crystal alignment is evaluated to be good under conditions in which light leakage is low and luminance of about 20 cd/cm² or less or about 10 cd/cm² or less is obtained.

The optical anisotropic film may play a role as a liquid crystal alignment film, an optical filter, a phase difference film, a polarizer or a polarized light emitter for use in optical devices such as liquid crystal displays.

A better understanding of the present invention may be obtained via the following examples which are set forth to illustrate, but are not to be construed as limiting the present invention.

Preparation Example 1: Synthesis of methyl 4-((6-(acryloyloxy)hexyl)oxy)benzoate (Synthesis of acrylate-based monomer compound for forming repeating unit of Chemical Formula 2)

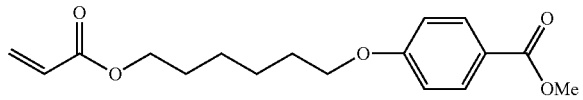

6.08 g (40 mmol) of methyl 4-hydroxybenzoate was dissolved in 50 ml of 2-butanone, 8.29 g (60 mmol) of $K_2CO_3$ was added, and then 5.44 g (40 mmol) of 6-chloro-1-hexanol was slowly added dropwise. While the resulting mixture was vigorously stirred, it was heated to 85° C. and refluxed for 18 hr, so that reaction was carried out.

After completion of the reaction, the resulting reaction solution was extracted with dichloromethane and water, the organic layer was separated and dehydrated over $MgSO_4$, and the solvent was removed using a rotary evaporator, followed by purification using a silica column, thus obtaining methyl 4-((6-hydroxyhexyl)oxy)benzoate at a yield of 76%. Subsequently, methyl 4-((6-hydroxyhexyl)oxy)benzoate (1 eq) was dissolved in dimethyl acetamide, and then acryloyl chloride (2.5 eq) was slowly added dropwise at 0° C., after which the reaction mixture was warmed to room temperature and then stirred for 2 hr. After completion of the reaction, the resulting reaction solution was extracted with a NaCl aqueous solution and diethyl ether and then purified using a silica column, giving methyl 4-((6-(acryloyloxy)hexyl)oxy)benzoate at a yield of 73%. The NMR data of the title compound was as follows.

NMR ($CDCl_3$ (500 MHz), ppm): 1.43-1.77 (8H, m), 3.89 (3H, s), 3.92 (2H, m), 4.06 (2H, m), 5.83 (1H, dd), 6.12 (1H, dd), 6.41 (1H, dd), 7.07 (2H, d), 7.94 (2H, d)

Preparation Example 2: Synthesis of propyl 4-((6-(acryloyloxy)hexyl)oxy)benzoate (Synthesis of acrylate-based monomer compound for forming repeating unit of Chemical Formula 2)

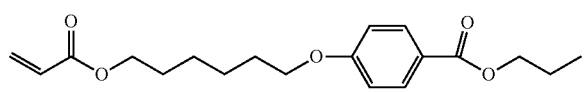

The title compound, that is, propyl 4-((6-(acryloyloxy)hexyl)oxy)benzoate was prepared in the same manner under the same conditions as in Preparation Example 1, with the exception that propyl 4-hydroxybenzoate was used, instead of methyl 4-hydroxybenzoate. The NMR data of the title compound was as follows.

NMR (CDCl$_3$ (500 MHz), ppm): 1.43-1.89 (10H, m), 3.90 (3H, s), 3.97 (2H, m), 4.08 (2H, m), 5.87 (1H, dd), 6.17 (1H, dd), 6.46 (1H, dd), 7.10 (2H, d), 7.88 (2H, d)

Preparation Example 3: Synthesis of methyl 4-((6-(acryloyloxy)propyl)oxy)benzoate (Synthesis of acrylate-based monomer compound for forming repeating unit of Chemical Formula 2)

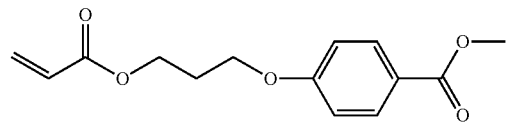

The title compound, that is, propyl 4-((6-(acryloyloxy)hexyl)oxy)benzoate was prepared in the same manner under the same conditions as in Preparation Example 1, with the exception that 6-chloro-1-propanol was used, instead of 6-chloro-1-hexanol. The NMR data of the title compound was as follows.

NMR (CDCl$_3$ (500 MHz), ppm): 1.54 (2H, m), 3.89 (3H, s), 3.92 (2H, m), 4.06 (2H, m), 5.81 (1H, dd), 6.14 (1H, dd), 6.41 (1H, dd), 7.07 (2H, d), 7.95 (2H, d)

Preparation Example 4: Synthesis of 4-(3-(acryloyloxy)propoxy)phenyl(E)-3-(4-methoxyphenyl)acrylate (Synthesis of monomer compound for forming photo-alignment repeating unit)

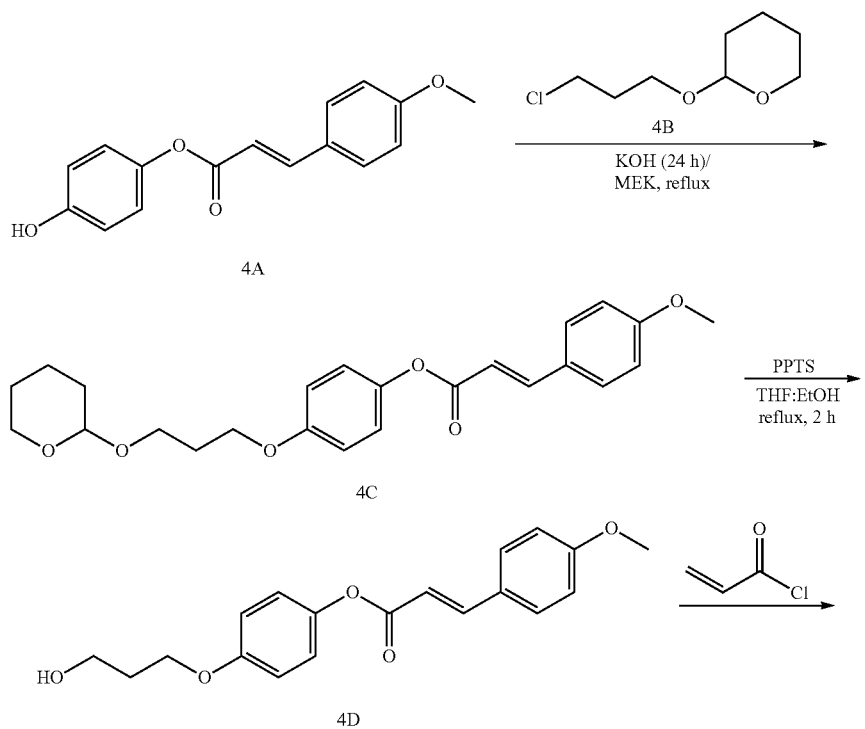

-continued

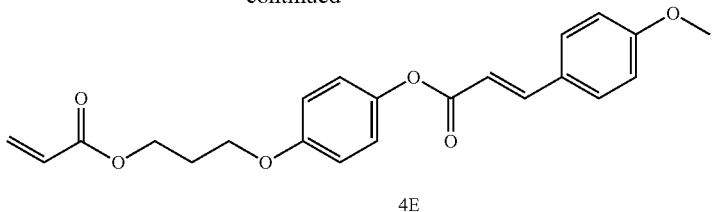

4E

Compound 4A, namely, 4-hydroxyphenyl(E)-3-(4-methoxyphenyl)acrylate, obtained by subjecting hydroquinone and 4-methyl cinnamic acid to a coupling reaction was used as a starting material. Using PPTS as a catalyst, 2H-pyran and 3-chloropropanol were reacted in the presence of a methylene chloride solvent, thus obtaining 2-(3-chloropropoxyl)tetrahydro-2H-pyran (Compound 4B) protected with THP. The 2-(3-chloropropoxyl)tetrahydro-2H-pyran (Compound 4B) thus obtained and the starting material 4-hydroxyphenyl(E)-3-(4-methoxyphenyl)acrylate (Compound 4A) were reacted while being refluxed in the presence of a methyl ethyl ketone solvent using KOH as a base. After about 24 hr, termination of the reaction was checked and work-up was conducted. Extraction with ethyl acetate and water was performed, and the ethyl acetate layer at the upper position was separately collected, washed once more with brine, dehydrated over MgSO$_4$ and filtered, and then the solvent was removed under reduced pressure. Thereafter, column chromatography was performed using a solution mixture of EA and Hex at 1:4 as a developing solvent, thus obtaining a desired intermediate, namely, 4-(3-((tetrahydro-2H-pyran-2-yl)oxy)propoxy)phenyl(E)-3-(4-methoxyphenyl) acrylate (Compound 4C) at a yield of 55%.

Subsequently, this compound was refluxed in the presence of a solvent mixture of THF and ethanol at 1:5 using PPTS for 2 hr and then subjected to column chromatography using a solution mixture of ethyl acetate and hexane at 1:4 as a developing solvent, thus obtaining an intermediate 4-(3-hydroxypropoxy)phenyl(E)-3-(4-methoxyphenyl)acrylate (Compound 4D) at a yield of 100% from which THP had been separated. Compound 4D (1 eq) was dissolved in dimethyl acetamide, acryloyl chloride (2.5 eq) was slowly added dropwise at 0° C., and stirring was performed at room temperature for 2 hr. After completion of the reaction, the resulting reaction solution was extracted with a NaCl aqueous solution and diethyl ether and then purified using a silica column, giving the title compound 4-(3-(acryloyloxy) propoxy)phenyl(E)-3-(4-methoxyphenyl)acrylate (Compound 4E) at a yield of 79%. The NMR data for the title compound is illustrated in FIG. 1.

Preparation Example 5: Synthesis of 4-(3-(acryloyloxy)propoxy)phenyl(E)-3-(4-ethoxyphenyl)acrylate (Synthesis of monomer compound for forming photo-alignment repeating unit)

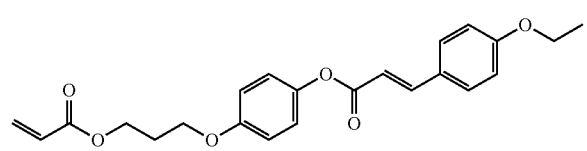

4-(3-(acryloyloxy)propoxy)phenyl(E)-3-(4-ethoxyphenyl)acrylate was prepared in the same manner under the same conditions as in Preparation Example 4, with the exception that 4-hydroxyphenyl(E)-3-(4-ethoxyphenyl) acrylate was used, instead of 4-hydroxyphenyl(E)-3-(4-methoxyphenyl)acrylate (Compound 4A).

Preparation Example 6: Synthesis of 4-(3-(acryloyloxy)propoxy)phenyl(E)-3-(4-chlorophenyl)acrylate (Synthesis of monomer compound for forming photo-alignment repeating unit)

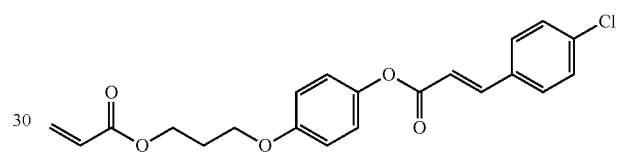

4-(3-(acryloyloxy)propoxy)phenyl(E)-3-(4-chlorophenyl)acrylate was prepared in the same manner under the same conditions as in Preparation Example 4, with the exception that 4-hydroxyphenyl(E)-3-(4-chlorophenyl)acrylate was used, instead of 4-hydroxyphenyl(E)-3-(4-methoxyphenyl)acrylate (Compound 4A).

Preparation Example 7: Synthesis of 4-(3-(acryloyloxy)propoxy)phenyl(E)-3-(4-cyanophenyl)acrylate (Synthesis of monomer compound for forming photo-alignment repeating unit)

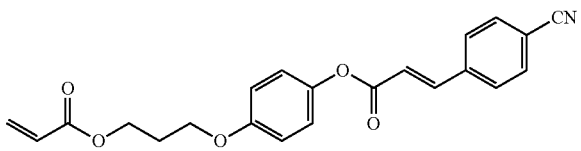

4-(3-(acryloyloxy)propoxy)phenyl(E)-3-(4-cyanophenyl) acrylate was prepared in the same manner under the same conditions as in Preparation Example 4, with the exception that 4-hydroxyphenyl(E)-3-(4-cyanophenyl)acrylate was used, instead of 4-hydroxyphenyl(E)-3-(4-methoxyphenyl) acrylate (Compound 4A).

Example 1: Preparation of Photo-Alignment Copolymer

The compound of Preparation Example 1 and the compound of Preparation Example 4 were used at a weight ratio of 5:5 and dissolved in ethyl acetate, and a radical initiator (AIBN) was added at a weight ratio of 1:250 relative to the monomer, after which the reaction was carried out at 60° C. for 18 hr. A final polymer compound was prepared at a yield of 78%, with a mass average molecular weight (Mw) of 35,000 and PDI of 3.78.

Example 2: Preparation of Photo-Alignment Copolymer

The compound of Preparation Example 1 and the compound of Preparation Example 5 were used at a weight ratio of 5:5 and dissolved in ethyl acetate, and a radical initiator (AIBN) was added at a weight ratio of 1:250 relative to the monomer, after which the reaction was carried out at 60° C. for 18 hr. A final polymer compound was prepared at a yield of 75%, with Mw of 42,000 and PDI of 3.89.

Example 3: Preparation of Photo-Alignment Copolymer

The compound of Preparation Example 1 and the compound of Preparation Example 6 were used at a weight ratio of 5:5 and dissolved in ethyl acetate, and a radical initiator (AIBN) was added at a weight ratio of 1:250 relative to the monomer, after which the reaction was carried out at 60° C. for 18 hr. A final polymer compound was prepared at a yield of 83%, with Mw of 54,500 and PDI of 4.31.

Example 4: Preparation of Photo-Alignment Copolymer

The compound of Preparation Example 1 and the compound of Preparation Example 7 were used at a weight ratio of 5:5 and dissolved in ethyl acetate, and a radical initiator (AIBN) was added at a weight ratio of 1:250 relative to the monomer, after which the reaction was carried out at 60° C. for 18 hr. A final polymer compound was prepared at a yield of 83%, with Mw of 46,100 and PDI of 4.12.

Example 5: Preparation of Photo-Alignment Copolymer

The compound of Preparation Example 2 and the compound of Preparation Example 4 were used at a weight ratio of 5:5 and dissolved in ethyl acetate, and a radical initiator (AIBN) was added at a weight ratio of 1:250 relative to the monomer, after which the reaction was carried out at 60° C. for 18 hr. A final polymer compound was prepared at a yield of 81%, with Mw of 57,600 and PDI of 3.47.

Example 6: Preparation of Photo-Alignment Copolymer

The compound of Preparation Example 2 and the compound of Preparation Example 5 were used at a weight ratio of 3:7 and dissolved in ethyl acetate, and a radical initiator (AIBN) was added at a weight ratio of 1:250 relative to the monomer, after which the reaction was carried out at 60° C. for 18 hr. A final polymer compound was prepared at a yield of 80%, with Mw of 61,800 and PDI of 3.78.

Example 7: Preparation of Photo-Alignment Copolymer

The compound of Preparation Example 3 and the compound of Preparation Example 4 were used at a weight ratio of 3:7 and dissolved in ethyl acetate, and a radical initiator (AIBN) was added at a weight ratio of 1:500 relative to the monomer, after which the reaction was carried out at 60° C. for 18 hr. A final polymer compound was prepared at a yield of 86%, with Mw of 31,900 and PDI of 3.47.

Example 8: Preparation of Photo-Alignment Copolymer

The compound of Preparation Example 3 and the compound of Preparation Example 5 were used at a weight ratio of 3:7 and dissolved in ethyl acetate, and a radical initiator (AIBN) was added at a weight ratio of 1:250 relative to the monomer, after which the reaction was carried out at 60° C. for 18 hr. A final polymer compound was prepared at a yield of 86%, with Mw of 41,300 and PDI of 3.86.

Comparative Example 1: Preparation of Photo-Alignment Polymer

Only the compound of Preparation Example 4 was used as a monomer, and dissolved in ethyl acetate, and a radical initiator (AIBN) was added at a weight ratio of 1:500 to the monomer, after which the reaction was carried out at 60° C. for 18 hr. A final polymer compound was prepared at a yield of 79%, with Mw of 45,600 and PDI of 4.06.

Comparative Example 2: Preparation of Photo-Alignment Polymer

Only the compound of Preparation Example 5 was used as a monomer, and dissolved in ethyl acetate, and a radical initiator (AIBN) was added at a weight ratio of 1:250 to the monomer, after which the reaction was carried out at 60° C. for 18 hr. A final polymer compound was prepared at a yield of 83%, with Mw of 45,600 and PDI of 4.41.

Test Example: Formation of Alignment Layer and Liquid Crystal Film and Evaluation of Properties Thereof A solution of the photo-alignment (co)polymer (2 to 3 wt % based on the solution) of each of the examples and comparative examples dissolved in toluene was applied onto a glass substrate using bar coating. The solution was primarily dried at 80° C. for 2 min, and irradiated with polarized UV having a wavelength range of 280 to 315 nm and a predetermined polarization direction so that photo-alignment was carried out. Subsequently, secondary drying was conducted at 150 to 200° C. for 10 to 30 min, and then optical anisotropy was measured. Furthermore, 20 to 25 wt % of reactive liquid crystals (reactive mesogen) were applied onto the photo-alignment layer formed as above using bar coating, dried at 60° C. for 2 min and then irradiated with non-polarized UV, yielding a final liquid crystal film.

After the photo-alignment process described above, the following test was conducted to measure anisotropy.

Specifically, UV absorbances of respective photo-alignment layers were measured. As such, the standard wavelength was 300 nm, and respective absorbances were measured using a UV-Vis spectrometer. Deduced from the results of measurement of absorbances were absorbance A1 in a direction perpendicular to the polarization direction of applied UV and absorbance A2 in a direction consistent with the polarization direction of applied UV, and the anisotropy value (dicroic ratio (DR)) was determined based on Equation 1 below. The results are shown in Table 1 below.

$$\text{Dicroic ratio (DR)} = (A1 - A2)/(A1 + A2) \quad \text{[Equation 1]}$$

wherein A1 is the absorbance in a direction perpendicular to the polarization direction of applied UV, and A2 is the absorbance in a direction consistent with the polarization direction of applied UV.

After photo-alignment under the above conditions, reactive liquid crystals were applied, and the ratio of area of the non-alignment portion (observed with the naked eye) relative to the entire area of the alignment layer was calculated, and thus alignability was evaluated based on the 5-point criteria. The results are shown in Table 1 below.

TABLE 1

| ENTRY (Photo-alignment (co)polymer) | 1st Dry conditions (Temp., Time) | 1st Dose (mJ/cm²) | 2nd Dry conditions (Temp., Time) | Anisotropy (DR) | Liquid crystal alignability |
|---|---|---|---|---|---|
| 1 (Ex. 1) | 80° C., 2 min | 800 | No | 0.129 | 4 |
| 2 (Ex. 1) | 80° C., 2 min | 800 | 150° C., 30 min | 0.195 | 5 |
| 3 (Ex. 1) | 80° C., 2 min | 800 | 180° C., 30 min | 0.235 | 5 |
| 4 (Ex. 1) | 80° C., 2 min | 800 | 200° C., 30 min | 0.204 | 5 |
| 5 (Ex. 2) | 80° C., 2 min | 800 | 150° C., 30 min | 0.192 | 5 |
| 6 (Ex. 2) | 80° C., 2 min | 800 | 180° C., 30 min | 0.223 | 5 |
| 7 (Ex. 3) | 80° C., 2 min | 800 | 150° C., 30 min | 0.184 | 5 |
| 8 (Ex. 3) | 80° C., 2 min | 800 | 180° C., 30 min | 0.201 | 5 |
| 9 (Ex. 4) | 80° C., 2 min | 800 | 150° C., 30 min | 0.178 | 5 |
| 10 (Ex. 4) | 80° C., 2 min | 800 | 180° C., 30 min | 0.198 | 5 |
| 11 (Ex. 5) | 80° C., 2 min | 800 | 150° C., 30 min | 0.201 | 5 |
| 12 (Ex. 5) | 80° C., 2 min | 800 | 180° C., 30 min | 0.245 | 5 |
| 13 (Ex. 6) | 80° C., 2 min | 800 | 150° C., 30 min | 0.176 | 5 |
| 14 (Ex. 6) | 80° C., 2 min | 800 | 180° C., 30 min | 0.189 | 5 |
| 15 (Ex. 7) | 80° C., 2 min | 800 | 150° C., 30 min | 0.167 | 5 |
| 16 (Ex. 7) | 80° C., 2 min | 800 | 180° C., 30 min | 0.184 | 5 |
| 17 (Ex. 8) | 80° C., 2 min | 800 | 150° C., 30 min | 0.183 | 5 |
| 18 (Ex. 8) | 80° C., 2 min | 800 | 180° C., 30 min | 0.224 | 5 |
| 19 (C. Ex. 1) | 80° C., 2 min | 800 | 150° C., 30 min | 0.085 | 4 |
| 20 (C. Ex. 1) | 80° C., 2 min | 800 | 180° C., 30 min | 0.081 | 3 |
| 21 (C. Ex. 2) | 80° C., 2 min | 800 | 150° C., 30 min | 0.073 | 3 |
| 22 (C. Ex. 2) | 80° C., 2 min | 800 | 180° C., 30 min | 0.070 | 4 |

As is apparent from Table 1, Entry Nos. 2 to 18 satisfying DR of 0.16 or more resulted from using the photo-alignment copolymers of the examples, and DR was increased after secondary drying. However, in Entry No. 1 without performing secondary drying, an increase in DR was comparatively low. This is considered to be because the repeating unit of Chemical Formula 2 may interact with the photo-reactive functional group of the photo-alignment repeating unit during thermal treatment, thus greatly increasing optical anisotropy.

Compared to the above examples, when using the photo-alignment polymers of Comparative Examples 1 and 2, DR was comparatively lower to a level of 0.9 or less.

Also, in the case of using the photo-alignment copolymers of the examples as seen in Table 1, superior liquid crystal alignability was exhibited, compared to the comparative examples.

What is claimed is:

1. A photo-alignment copolymer, comprising:
   a photo-alignment repeating unit of Chemical Formula 1; and
   a repeating unit of Chemical Formula 2 below:

[Chemical Formula 1]

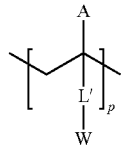

wherein A is each independently hydrogen or $C_1$-$C_3$ alkyl,
L' is a spacer group having a combination of at least one bivalent connecting group selected from the group consisting of a single bond, carbonyl, —C(=O)O—, —OC(=O)—, —O—, —S—, substituted or unsubstituted $C_1$-$C_{20}$ alkylene and substituted or unsubstituted $C_6$-$C_{40}$ arylene, and
W is a photo-reactive functional group of Chemical Formula 1a,

[Chemical Formula 1a]

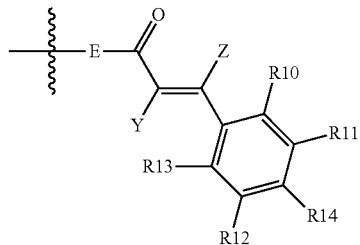

wherein E is a single bond; —O—; substituted or unsubstituted $C_1$-$C_{20}$ alkylene; or substituted or unsubstituted $C_6$-$C_{40}$ aryleneoxide,
Y and Z are each independently hydrogen; or substituted or unsubstituted $C_1$-$C_{20}$ alkyl,
$R_{10}$, $R_{11}$, $R_{12}$ and $R_{13}$ are identical to or different from each other and are each independently selected from the group consisting of hydrogen; halogen; substituted or unsubstituted $C_1$-$C_{20}$ alkyl; substituted or unsubstituted $C_4$-$C_8$ cycloalkyl; substituted or unsubstituted $C_1$-$C_{20}$ alkoxy; substituted or unsubstituted $C_6$-$C_{30}$ aryloxy; substituted or unsubstituted $C_6$-$C_{40}$ aryl; $C_6$-$C_{40}$ heteroaryl containing a hetero element of Group 14, 15 or 16; substituted or unsubstituted $C_6$-$C_{40}$ alkoxyaryl; cyano; nitrile; nitro; and hydroxyl, $R_{14}$ is halogen; unsubstituted $C_1$-$C_{20}$ alkoxy; or cyano,

[Chemical Formula 2]

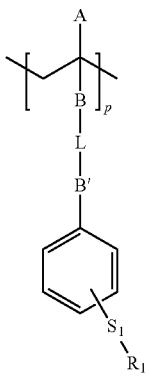

[Chemical Formula 3]

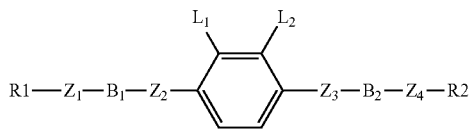

[Chemical Formula 4]

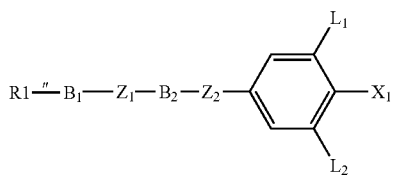

in Chemical Formulas 3 and 4, $L_1$ and $L_2$ are each independently selected from the group consisting of hydrogen, halogen, substituted or unsubstituted $C_1$-$C_{20}$ alkyl, substituted or unsubstituted $C_1$-$C_3$ alkyl ester, substituted or unsubstituted $C_1$-$C_8$ alkyl ether, and substituted or unsubstituted $C_1$-$C_3$ alkyl ketone, $B_1$ and $B_2$ are each independently substituted or unsubstituted $C_6$-$C_{20}$ arylene or substituted or unsubstituted $C_4$-$C_3$ cycloalkylene, R1 and R2 are each independently (meth)acryl or epoxy, $X_1$ is selected from the group consisting of $C_1$-$C_7$ alkyl unsubstituted or substituted with fluorine, $C_1$-$C_7$ alkoxy unsubstituted or substituted with fluorine, $C_2$-$C_7$ alkenyl unsubstituted or substituted with fluorine, $C_2$-$C_7$ alkenyloxy unsubstituted or substituted with fluorine, and $C_1$-$C_7$ alkoxyalkyl unsubstituted or substituted with fluorine, and $Z_1$, $Z_2$, $Z_3$ and $Z_4$ are each independently a single bond, —O—, —S—, —COO—, —OCO— or —OC(O)O—.

wherein A is each independently hydrogen or $C_1$-$C_3$ alkyl,

B and B' are each independently carbonyl, —C(=O)O—, —OC(=O)—, —O— or —S—,

L is a single bond, or substituted or unsubstituted $C_1$-$C_{20}$ alkylene, $S_1$ is —C(=O)O—, and $R_1$ is a substituted or unsubstituted $C_1$-$C_{20}$ alkyl.

2. The photo-alignment copolymer of claim 1, wherein the spacer group of L' has a structure in which a single bond or carbonyl, substituted or unsubstituted $C_1$-$C_{20}$ alkylene, and substituted or unsubstituted $C_6$-$C_{40}$ arylene are sequentially connected via —O—.

3. The photo-alignment copolymer of claim 1, wherein in Chemical Formula 2, B is —C(=O)O—, L is substituted or unsubstituted $C_1$-$C_{20}$ alkylene, and B' is —O—.

4. The photo-alignment copolymer of claim 2, wherein $C_6$-$C_{40}$ arylene contained in the spacer group of L' is substituted with at least one functional group selected from the group consisting of $C_1$-$C_6$ alkyl, $C_1$-$C_6$ halogenated alkyl, halogen, $C_1$-$C_6$ alkoxy, $C_1$-$C_6$ halogenated alkoxy, $C_1$-$C_6$ alkylester, $C_1$-$C_6$ halogenated alkylester, $C_1$-$C_6$ alkylate and $C_1$-$C_6$ halogenated alkylate.

5. The photo-alignment copolymer of claim 1, wherein the photo-alignment repeating unit and the repeating unit of Chemical Formula 2 are contained at a molar ratio of the photo-alignment repeating unit:the repeating unit of Chemical Formula 2=10:90 to 99:1.

6. The photo-alignment copolymer of claim 1, which has a weight average molecular weight of 20,000 to 1,000,000.

7. A composition for forming an optical anisotropic film, comprising the photo-alignment copolymer of claim 1.

8. The composition of claim 7, further comprising a reactive mesogen.

9. The composition of claim 8, wherein the reactive mesogen includes a compound of Chemical Formula 3 or 4 below:

10. The composition of claim 7, further comprising a photocurable binder.

11. The composition of claim 10, wherein the photocurable binder includes at least one polyfunctional (meth)acrylate compound selected from the group consisting of pentaerythritol triacrylate, tris(2-acrylolyloxyethyl)isocynurate, trimethylolpropane triacrylate and dipentaerythritol hexaacrylate.

12. The composition of claim 7, further comprising a photoinitiator for initiating UV curing.

13. The composition of claim 7, comprising, based on a total weight of solids of the composition, 1 to 50 wt % of the photo-alignment copolymer, 10 to 90 wt % of a reactive mesogen, 1 to 50 wt % of a photocurable binder, and 0.1 to 5 wt % of a photoinitiator.

14. The composition of claim 7, further comprising an organic solvent.

15. A method of manufacturing an optical anisotropic film, comprising:
irradiating the composition of claim 7 with polarized UV, thus optically aligning at least a portion of a photo-reactive functional group linked to a photo-alignment copolymer; and
thermally treating the composition in which at least a portion of the photo-reactive functional group is optically aligned, thus increasing optical anisotropy.

16. The method of claim 15, further comprising photo-curing a reactive mesogen or a photocurable binder contained in the composition having increased optical anisotropy, after thermally treating.

17. The method of claim 16, wherein the reactive mesogen is subjected to liquid crystal alignment by the optically aligned photo-reactive functional group of the photo-alignment copolymer.

18. An optical anisotropic film, formed on a substrate and comprising a cured product of the composition of claim 7.

19. The optical anisotropic film of claim 18, which includes a single layer of the cured product.

20. The optical anisotropic film of claim 18, wherein the cured product includes a photo-alignment copolymer in which at least a portion of a photo-reactive functional group is optically aligned, a cured product of a reactive mesogen subjected to liquid crystal alignment by the optically aligned photo-reactive functional group, and a binder resin including a (meth)acrylate-based crosslinked polymer.

21. The optical anisotropic film of claim 18, which functions as a liquid crystal alignment film, an optical filter, a phase difference film, a polarizer or a polarized light emitter.

* * * * *